United States Patent
Heitele

(10) Patent No.: US 10,994,233 B2
(45) Date of Patent: May 4, 2021

(54) WATER FILTER CARTRIDGE WITH AIR CONDUCTION

(71) Applicant: AQUIS WASSER-LUFT-SYSTEME GMBH, LINDAU, Zweigniederlassung Rebstein, Rebstein (CH)

(72) Inventor: Bernd Heitele, Marbach (CH)

(73) Assignee: AQUIS Wasser-Luft-Systeme GmbH, Lindau Zweigniederlassung Rebstein, Rebstein (CH)

(*) Notice: Subject to any disclaimer, the term of this patent is extended or adjusted under 35 U.S.C. 154(b) by 0 days.

(21) Appl. No.: 15/240,995

(22) Filed: Aug. 18, 2016

(65) Prior Publication Data

US 2017/0050133 A1 Feb. 23, 2017

(30) Foreign Application Priority Data

Aug. 21, 2015 (DE) ...................... 10 2015 113 882.4
Sep. 23, 2015 (DE) ...................... 10 2015 116 076.5

(51) Int. Cl.
*B01D 35/157* (2006.01)
*B01D 36/00* (2006.01)
(Continued)

(52) U.S. Cl.
CPC ........ *B01D 35/1573* (2013.01); *A47J 31/605* (2013.01); *B01D 29/15* (2013.01); *B01D 29/88* (2013.01); *B01D 35/02* (2013.01); *B01D 35/027* (2013.01); *B01D 36/001* (2013.01); *B01J 47/024* (2013.01); *C02F 1/001* (2013.01); *C02F 1/003* (2013.01); *C02F 1/42* (2013.01); *C02F 2101/10* (2013.01); *C02F 2301/04* (2013.01); *C02F 2303/22* (2013.01); *C02F 2307/12* (2013.01); *F24F 6/00* (2013.01); *F24F 2006/006* (2013.01); *F24F 2006/008* (2013.01)

(58) Field of Classification Search
None
See application file for complete search history.

(56) References Cited

U.S. PATENT DOCUMENTS 5,238,559 A * 8/1993 Nieweg .................. B01D 24/04
210/264
6,638,426 B1 * 10/2003 Fritter .................. B01D 36/001
210/266

(Continued)

FOREIGN PATENT DOCUMENTS

DE 196 08 372 A1 9/1997
DE 297 23 246 U1 10/1998
(Continued)

OTHER PUBLICATIONS

Perky Pet; Beeztees, 15887 Perky-Pet Vogeltraenke and Trixie 5453 at least as early as Sep. 23, 2015.
(Continued)

*Primary Examiner* — Benjamin M Kurtz
(74) *Attorney, Agent, or Firm* — Breneman & Georges

(57) ABSTRACT

The present invention relates to a water filter cartridge, with a housing and a flow path for air for ventilating a water tank storing water to be processed by the water filter cartridge. The latter is distinguished in that the flow path has a first water barrier.

19 Claims, 9 Drawing Sheets

Figure 1:
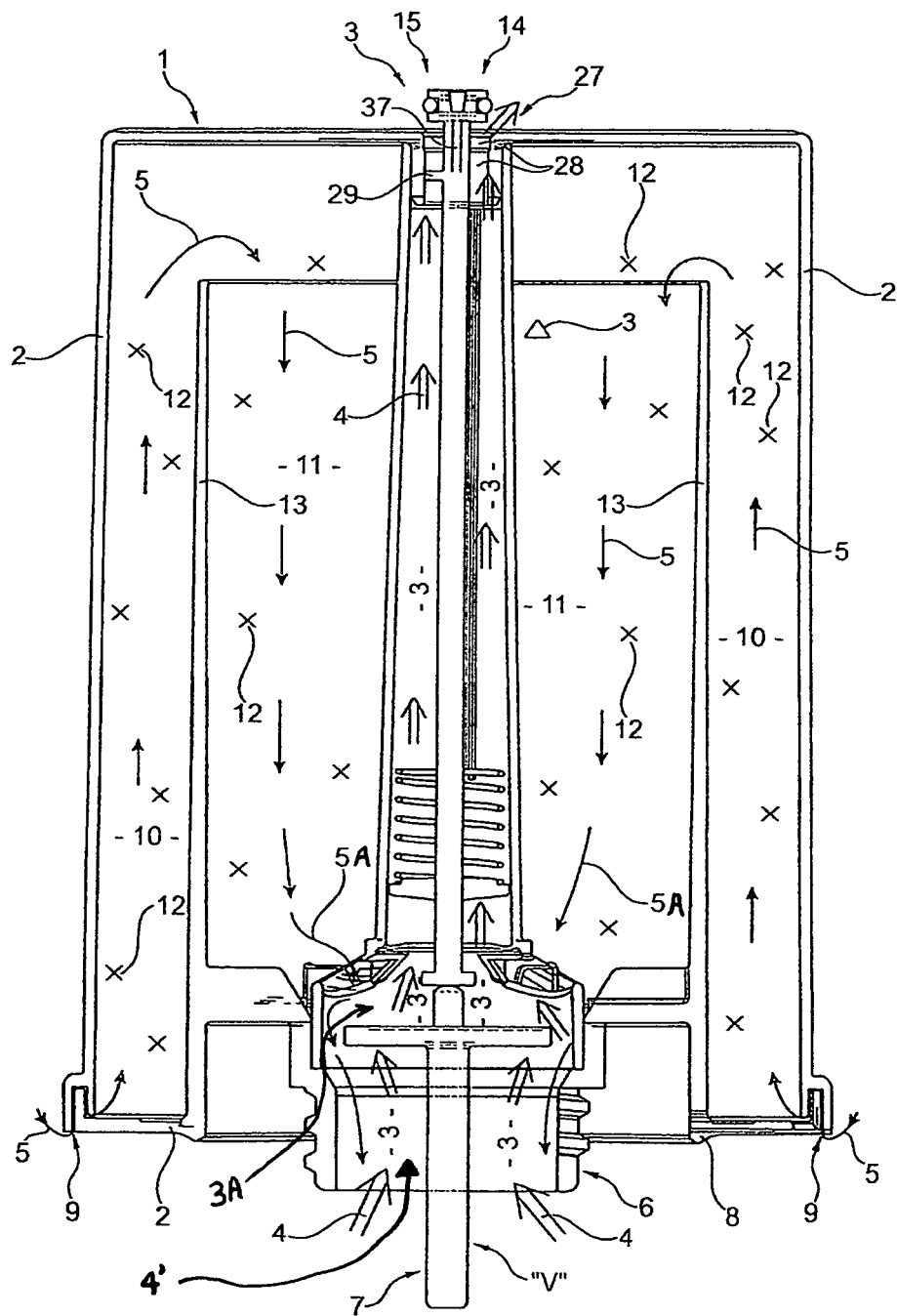

(51) Int. Cl.
  *C02F 1/42*    (2006.01)
  *B01J 47/024*  (2017.01)
  *B01D 35/027*  (2006.01)
  *B01D 29/15*   (2006.01)
  *B01D 29/88*   (2006.01)
  *B01D 35/02*   (2006.01)
  *C02F 1/00*    (2006.01)
  *A47J 31/60*   (2006.01)
  *F24F 6/00*    (2006.01)
  *C02F 101/10*  (2006.01)

(56)         References Cited

U.S. PATENT DOCUMENTS 8,105,486 B1   1/2012   Kuo
  9,109,721 B1   8/2015   Williams et al.
  9,487,413 B2   11/2016  Mitchell et al.

FOREIGN PATENT DOCUMENTS

DE         199 25 635  A1   12/2000
  EP           0 404 573      12/1990
  WO      WO 2015/038719 A1    3/2015

OTHER PUBLICATIONS

Vogeltraenke Wasser (bird water drinker) and Nobby Omnia at least as early as Sep. 23, 2015.

\* cited by examiner

WATER FILTER CARTRIDGE WITH AIR CONDUCTION

CROSS REFERENCE TO RELATED APPLICATIONS

This application is related to the subject matter of U.S. application Ser. No. 15/240,946 filed Aug. 18, 2016 with the title WATER FILTER CARTRIDGE WITH AIR INDUCTION.

The present invention relates to a water filter cartridge according to the preamble of Claim 1.

DESCRIPTION

In air humidifiers, in particular tabletop devices, tap water from a tank is generally finely dispersed and supplied to an air flow which carries the finely dispersed droplets (mist) out of the device. The actual evaporation or dissipation of the mist then takes place outside the device.

Such a type of air humidifier is equipped, for example, with a water tank which is upwardly closed with respect to the surroundings. The water used for the humidification then therefore only flows out of the tank into the device if air can rise from below into the tank in a manner corresponding to the water consumption. These devices operate in a similar manner to a bird bath, according to which the water coming up from below in the device interrupts a further discharge from the tank since said water prevents pressure equalization by air flowing in thereafter.

Devices of this type are widespread nowadays since the liquid level in the air humidifier is regulated in a simple manner by the bird bath principle without valves and sensor technology.

Due to the use of tap water which contains minerals, the problem arises during the operation of such devices that, when the dispersed water is evaporated in the room, the minerals remain in the water and form a readily visible bright dust on surfaces. In order to avoid said bright deposit, which is also called "white dust", demineralized water can be used for the evaporation. It is particularly pleasant for the user to use a filter for reducing the mineral content of the tap water used in the air humidifier in order to avoid "white dust". Air humidifier systems which are equipped with demineralization cartridges or water filter cartridges are therefore already commercially available. Significant reductions in "white dust" are therefore already achievable.

The present subject matter for which protection is sought is based on the object of further reducing the occurrence of "white dust".

This object is achieved starting from the preamble of Claim 1 by the characterizing features of the latter. Expedient and advantageous developments are specified in the dependent claims.

Accordingly, a water filter cartridge has a housing and a flow path for air for ventilating a water-storing water tank which feeds the water filter cartridge. According to the invention, a water filter cartridge of this type is distinguished in that the flow path for air has a first water barrier in particular against water flowing downwards. It can therefore be prevented, or at least significantly reduced, that, during operation of the filter, water can emerge unfiltered via the flow path for air for ventilating the water tank, instead of via the filter bed, and can form "white dust" upon evaporation. By means of the achievement of the object, the reduction in the water emerging unfiltered via the flow path for air is limited to a quantity of at max. 0%-20% in relation to the quantity of filtered water, preferably to a quantity portion in relation to the filtered water quantity of 0% to 10% over the recommended service life of the respectively used water filter cartridge and independently of the respective filling volume of the water tank, in particular in the case of water tanks with a maximum height of 500 mm, preferably at a height of 200 to 350 mm. This first water barrier can preferably comprise a blow-off opening. Air for the pressure equalization can indeed escape into the tank via said blow-off opening. However, said opening is of such small design that, by contrast, however, air located in the flow path is prevented from penetrating by water coming up from the outside because of the surface tension inherent to said water. The blow-off opening can preferably have a clear width<6 mm and >0.5 mm. Particularly preferably 1 mm±0.25 mm.

Furthermore preferably, the water barrier can also comprise an air-collecting chamber. Such an air-collecting chamber can be formed, for example, directly upstream of the blow-off opening in the flow direction. A sufficiently large air cushion can therefore be provided in an advantageous manner in the region of the blow-off opening, and therefore, even when air exits through the blow-off opening, further air is still always maintained upstream of the blow-off opening in the flow direction, during the filtering operation of the water filter cartridge, said reliably preventing water from penetrating. In a preferred manner, the air-collecting chamber can have a cross-sectional contour of annular design. The geometries relevant to the effect can therefore be readily adapted in respect of avoiding the passage of water because of the prevailing surface tension.

The realization of an air-collecting chamber with a cross-sectional structure of annular design can be implemented, for example, by the fact that the chamber per se is of approximately cylindrical design, in the center of which, for example, a tappet for actuating a valve is guided and therefore defines a volume remaining free annularly in the chamber.

Said air-collecting chamber can be bounded towards the outside in the flow direction by a shoulder or disk which is formed around the tappet and reaches radially as far as the cylindrical inner wall of the air chamber. In order to form the blow-off opening with corresponding geometries, it is possible, in a furthermore advantageous manner, for example in the shoulder or disk, or also called annular shoulder, for an exit point to be formed in a segment in order to realize the blow-off opening.

In order to guide the air for ventilating the water tank along the flow path for air, said flow path, in a furthermore preferred manner, can comprise a first directing element for directing the air flow. Said directing element can preferably be designed, for example, in the form of a tubular structure. Therefore, firstly, following air can be steered in the direction of the air-collecting chamber and, secondly, the inflow of water in said region can be prevented.

By means of the formation of a conical portion in said first directing element along the flow path for air, water which accumulates therein, in particular water which accumulates initially during startup, can flow out and a back-up and collecting effect for air along the flow path can also already be realized upstream of the air-collecting chamber.

In a moreover preferred embodiment, the flow path can have a second water barrier against rising water. With said water barrier, when a water column is formed in the flow path from the outlet side of the water out of the filter bed, an inner breakthrough of water to the blow-off opening, and therefore a bypassing of the water filter cartridge can be prevented. Said second water barrier is preferably realized in the form of a portion of the flow path that has a reduced conduit cross section in relation to a portion of the flow path that is formed upstream therefrom in the flow direction of the air during operation preferably abruptly reduced. Particularly preferably, the second water barrier can comprise a narrowing of stepped design in the cross section of the flow path. Therefore, even an adhesion-induced creep effect of water which may accumulate can be specifically prevented. A narrowing of this type can be realized, for example, in the form of a cylindrical sleeve which is arranged, for example, in the first directing element for directing the air flow. For example, in the form of a plug-in sleeve, in particular a plug-in sleeve which is arranged on the housing cover, is inserted into the end side of the tubular structure and is positioned so as to reduce the latter in cross section in a graduated manner.

This element can preferably be realized by the wall of the air-collecting chamber. By means of the formation of a radially outwardly directed slope on the end side of said cylindrical sleeve, a further increase in the creep or flow resistance for water can be realized because of the collecting effect induced by the surface tension in the annular groove, which is thereby produced in relation to the inner wall of the first subelement for air, in order to prevent the rising of water.

Furthermore, in order to conduct away water collecting upon startup in the first directing element for directing the air flow, in a further preferred embodiment the flow path for air can comprise a second directing element for discharging water, for example in the form of a run-off rib. The latter can in particular preferably have a portion which is oriented vertically in the operating position of the water filter cartridge. Firstly, an initial draining of water out of the flow path for air can therefore also be achieved. And therefore an interruption to the bypass by severing said bypass path initially brought about with respect to the filter path. Secondly, in a furthermore advantageous manner, when water droplets arise in the first directing element for directing the air flow, a gravitation-induced automatic running off can also be brought about in the event of a corresponding increase in the size of the drops.

In a furthermore preferred embodiment, shut-off means can be provided for the flow path for air. With such shut-off means, in a furthermore advantageous manner, the manner of operation of a water filter cartridge of this type can also be influenced—a filter operation according to the "bird bath principle" or filter operation with a water tank which is open with respect to air. That is to say, with this feature, a sudden extension in the use possibility of such water filter cartridges can be achieved. This is because even a reduction in "white dust" that is independent of the operating mode of the device in question is therefore possible.

This is because, when the shut-off means is open, air flows from below through the flow path into an otherwise closed water tank, and a corresponding volume of water to be processed by the water filter cartridge flows out of the tank until the water level in a receiving vessel, also called drinking vessel, has risen again until air can no longer penetrate into the system below the lower edge of a partition realizing the bird bath principle and therefore pressure equalization prevails in the interior of said system. Further water processed by the water filter cartridge can only flow out again if a route for the further supply of air for ventilating the water tank is produced by corresponding lowering of the level in the water removal basin. As long as said tank system is closed in an air-tight manner, water therefore cannot be removed from the system in any other manner.

The hydraulic circumstances force the water which is stored in the tank and is to be processed by the water filter cartridge through the inlet openings, which are provided in the housing, for the water via the filtering section as far as the filter cartridge outlet.

Secondly, the shut-off means provided according to the invention for the flow path for air opens up the possibility of extending the use region of such water filter cartridges. This follows from the fact that, in its active state, i.e. when the flow path for air is closed, it is ensured that, even for a water tank which is open with respect to air, water is reliably filtered as it flows through the water filter cartridge. This is because, after the flow path for air is shut off, the water stored in the tank can only flow, because of the lack of an alternative route, through the filter path formed in the water filter cartridge. In the case of a water filter cartridge which, in the regular operating state, is arranged at the bottom of the tank and has an inlet and outlet opening, the hydraulically effective levels of which are likewise located in the vicinity of the bottom of the tank, such a water tank with a water filter cartridge according to the invention can even be emptied completely.

For said second operating mode, it is true that additional regulating and/or control means are required for influencing the flow behavior. However, in an advantageous manner, because the requirement of in each case having to rotate the water tank concerned for each filling ceases to apply, devices having comparatively large tank volumes, which may be significantly more than 10 liters, can be realized by means of the water filter cartridge according to the invention. Comparatively significantly increased operating times can therefore be realized. A further advantage resides in the possibility of simpler handling of the tank concerned, for example by means of repeated supply of smaller refilling quantities, which are therefore easier to handle—without the requirement of having to transport a full tank and "place it end up" in the device concerned. By means of the water filter cartridge according to the invention, even for said "open" systems operating hydraulically completely differently from the "bird bath principle", satisfactory demineralization of the water which can be stored in the water tank can therefore be ensured and "white dust" prevented.

The shut-off means can be realized here in different ways. For example, in a first embodiment, as a valve, for example with a valve seat and valve body which can be placed thereon in a sealing manner. It is considered to be particularly advantageous here if an elastic sealing element is provided between valve seat and valve body. Unevenness which may be present and/or different gap widths between valve seat and valve body can therefore be sealed against leakage by deformation of the elastic sealing element.

In order to be able to bring about reliably lasting sealing of a valve of this type, in a furthermore advantageous embodiment holding or fastening means for the valve body in the valve seat are provided. In a first embodiment, said means can be realized simultaneously by the elastic sealing element between valve seat and valve body. For this purpose, it is preferred if the valve seat has a corresponding longitudinal extent, and therefore the elastic sealing body can be reliably fixed therein between valve seat and valve body. In a first variant, the elastic sealing body can be arranged here on the valve body and, with the latter, can be disengaged from the valve seat in accordance with the desired operating state "open" or "closed", or, conversely, the valve body can be positioned in the valve seat in a fixing and in particular advantageously simultaneously sealing manner. In an alternative embodiment, such an elastic sealing body for fixing the valve body can also be arranged in the valve seat. For such sealing bodies, O-rings are regarded as particularly advantageous since the latter also have excellent properties for compensating for any unevenness and symmetries which are present.

In an alternative variant, the shut-off means can be designed, for example, in the form of a membrane. Such a membrane can be realized, for example, in the form of a flexible, in particular thin-walled or flat body which is arranged over the outlet opening in the flow path for air in such a manner that said body closes said outlet opening at least in the uninfluenced state. For example, said body can be realized in the form of a lamella or tab which, by means of gravity, but preferably also by means of sufficient internal stress, bears in a sealing manner against the outlet opening in the flow path for air to prevent the penetration of water.

The connection of a shut-off means designed in such a manner to the housing of the water filter cartridge is preferably designed such that the tab or the lamella is fixed to the housing to the side of the outlet opening of the flow path, and therefore, in the event of pressurization, the shut-off means can be raised out of the interior of the water filter cartridge, i.e. from the flow path for air, to an extent such that the flowing air can escape out of the filter cartridge. By contrast, water coming up on the outer side of the housing of the water filter cartridge is prevented from penetrating into the flow path for air by means of the shut-off means. For this purpose, firstly, the air escaping from the flow path can build up a corresponding resistance against the penetration of water. Secondly, water coming up on the outer side correspondingly produces additional pressure on the shut-off means, and therefore the water itself presses the latter in a sealing manner against its complementary contact surface on the outer side of the housing of the filter cartridge in a manner additionally increasing the sealing effect in particular if no air rises out of the flow path.

In a furthermore preferred embodiment, securing means and/or resetting means can be provided for the shut-off means. Such securing means can prevent the shut-off means for the flow path from being inadvertently opened. By means of resetting means, for example, deactivated shut-off means can be activated again. If, for example, the shut-off means are realized in the form of a valve, said valve can be correspondingly held in a closed state and/or returned into said state by the securing means and/or resetting means.

By providing elastic properties for the securing means and/or resetting means, it is possible for the latter to permit, for example, position and/or functional variability for the shut-off means for the flow path for air, in particular for the shut-off means. If the securing means and/or resetting means comprise a spring element, the latter, acted upon with corresponding pretension, can hold the shut-off means in the activated state. Accordingly a valve would be closed. Resetting means designed in such a manner would in turn return a closed valve, after the forces required for opening the valve cease, into its closed state. An automated operating functionality for the water filter cartridge can therefore be realized in an advantageous manner. That is to say, an operating state for the use of the water filter cartridge in an open water tank can be ensured without the action of corresponding deactivating forces for the shut-off means.

For shut-off means in the form of a membrane, for example a covering film, in particular a self-adhesive covering film, can be provided as the securing means, or a detachable adhesive layer or a removable stable covering body or similar securing means additionally fixing the membrane in the blocking operating mode (second operating mode).

In order to ensure that the same water filter cartridge also operates correctly in a closed water tank, in particular a water tank which is closed in an air-tight manner and which can be emptied according to the "bird bath principle", opening means for the shut-off means can be provided in a furthermore preferred embodiment. Said opening means ensure that, when the water filter cartridge is inserted, the shut-off means are correspondingly deactivated. If the latter are realized, for example, by a valve, the opening means can ensure that the valve is opened. For this purpose, a structure mechanically transmitting pressure can preferably be provided. Such a structure can be realized, for example, in the form of a tappet which can act on the valve in the opening direction. This can be undertaken, for example, by the fact that, when the water filter cartridge is connected to the relevant tank connection, the end side of the tappet preferably butts against a mechanism which, for its part, when the water tank is placed onto the relevant device, is likewise offset in the direction in which the valve closing the flow path for air is to be opened. Said tank-side structure is preferably at the same time the tank outlet valve which, for its part, is opened when the tank is placed onto the device. It can therefore be ensured that, for this case, and only for this case, the water filter cartridge is automatically operated in the operating state which is provided for a closed tank, namely with the flow path for air opened up for ventilating the water tank containing water to be processed by the water filter cartridge.

In a furthermore preferred manner, the water filter cartridge can comprise a water inlet opening, in the lower tenth of the vertical extent of the housing of the water filter cartridge, with reference to the operating situation. As a result, it can be ensured in an advantageous manner that a water tank equipped with such a water filter cartridge can be at least virtually emptied.

By means of the formation of an indentation in the cover region of the housing, in which the air ventilating the tank emerges from the water filter cartridge, what is referred to as an "air trap" can be realized, in which air bubbles, until they reach a certain size, preferably remain adhering to the outer side of the blow-off opening and the region surrounding the latter. By this means, in a furthermore advantageous manner, additional protection against the penetration of water through the blow-off opening during the filter operation can be provided.

A further advantage of such an indentation formed on the end side resides in the mechanical protection which is thereby provided in the form of the sealing region, which is located deeper than the outer boundary of the indentation, between the housing of the water filter cartridge and a water barrier and/or a shut-off means for preventing the penetration of water into the water filter cartridge. Furthermore, a reliably stable depositing surface for the water filter cartridge can also be provided by means of the indentation edge surrounding the indentation. Particularly advantageously, when the filter cartridge is installed on the tank cover concerned, this can have the effect that said filter cartridge cannot roll away.

An outer rounding of the housing in the region of the "cover" of the water filter cartridge, for example in the form of a hemispherical structure or the like, between the indentation edge and the remaining housing, for example a sleeve-like portion of the housing, can make it possible, by means of the resulting reduction in the outer volume for the water filter cartridge, for an increase in the usable tank content for the water to be stored therein to be brought about in an advantageous manner. A further advantage can therefore be achieved, with reference to the ergonomic shape, in better handling of the filter cartridge for installation and removal purposes.

FIGURES

Figure 2:
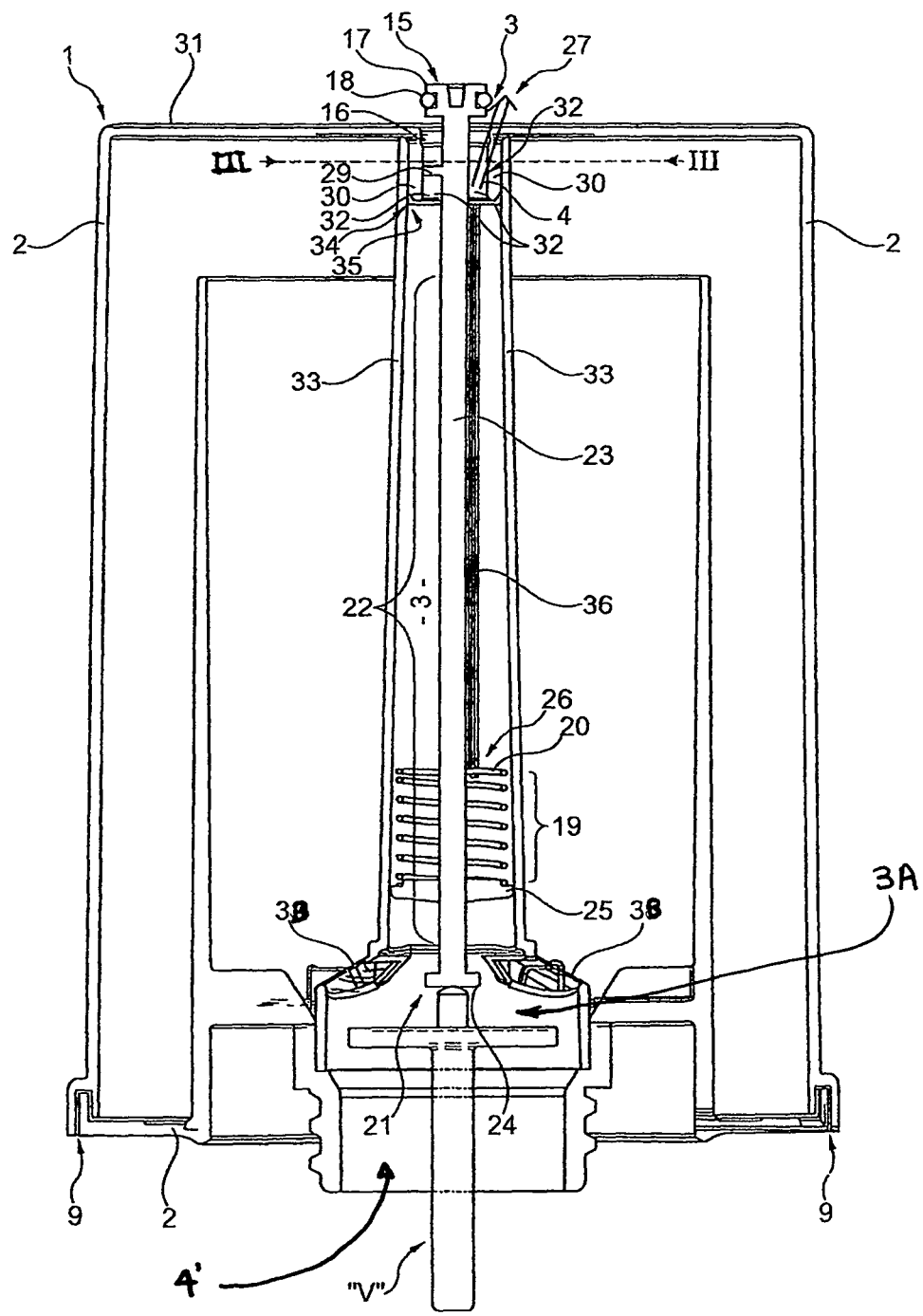
Figure 3:
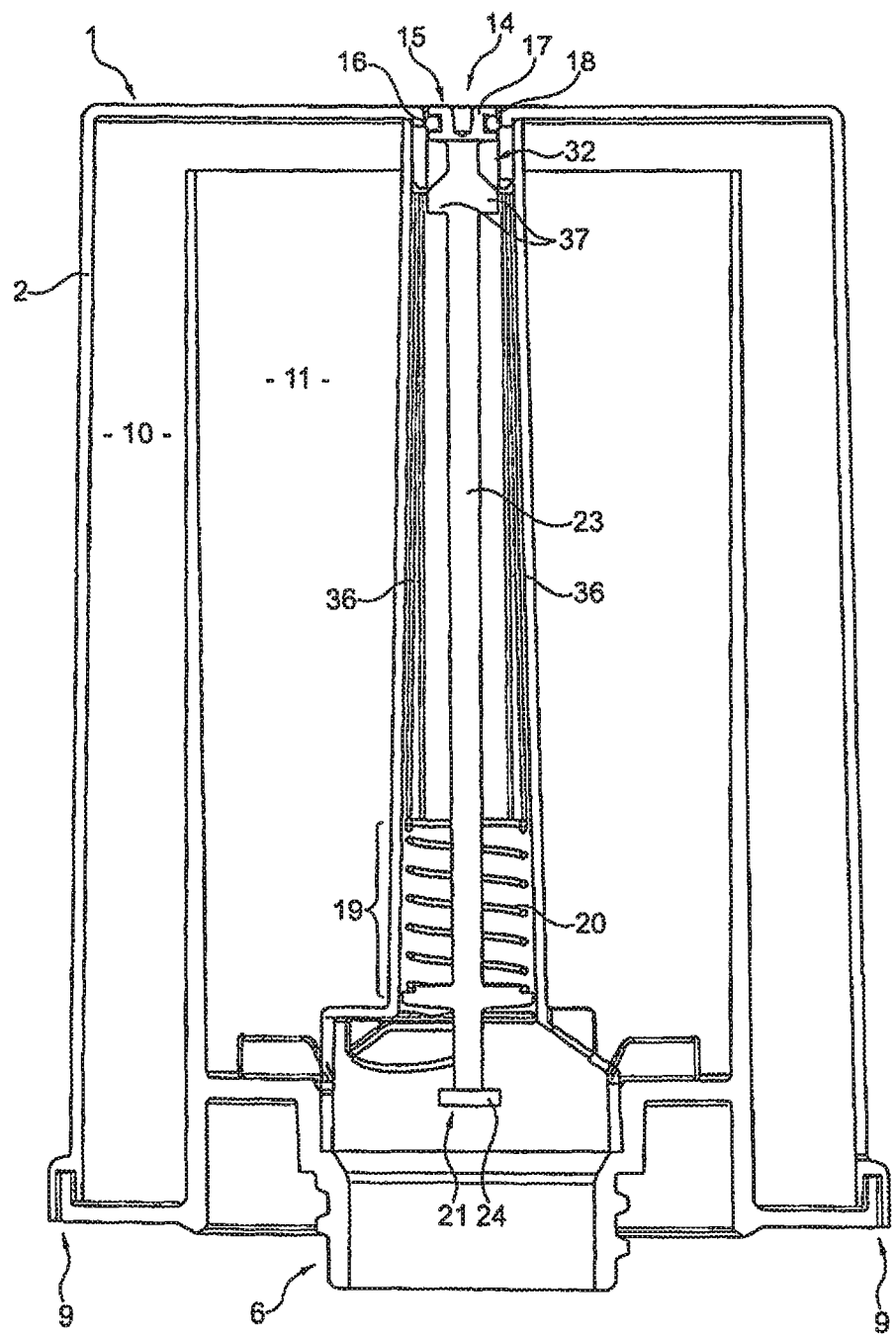
Figure 4:
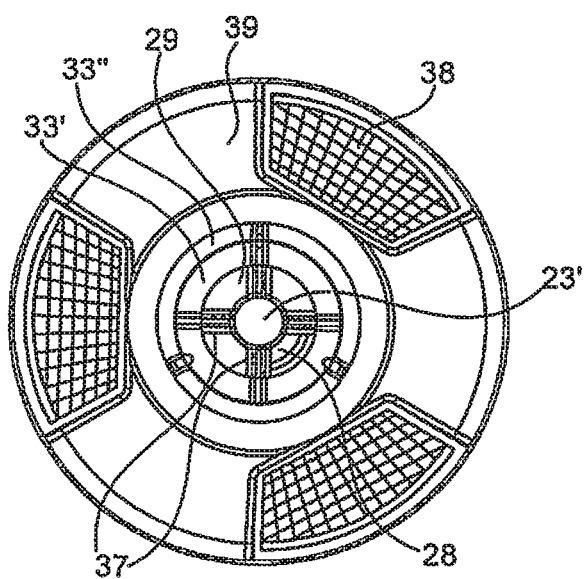
Figure 5:
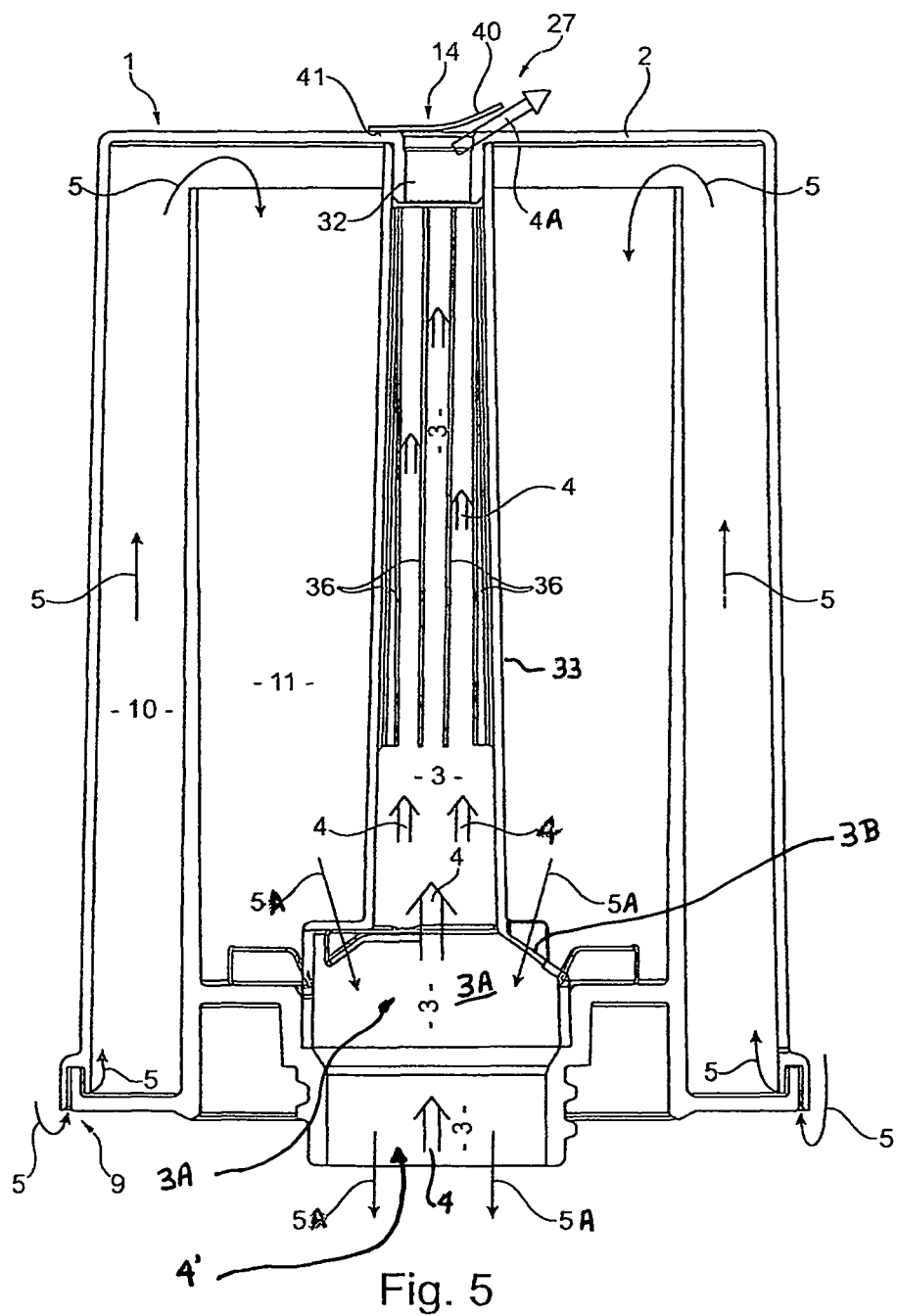
Figure 6:
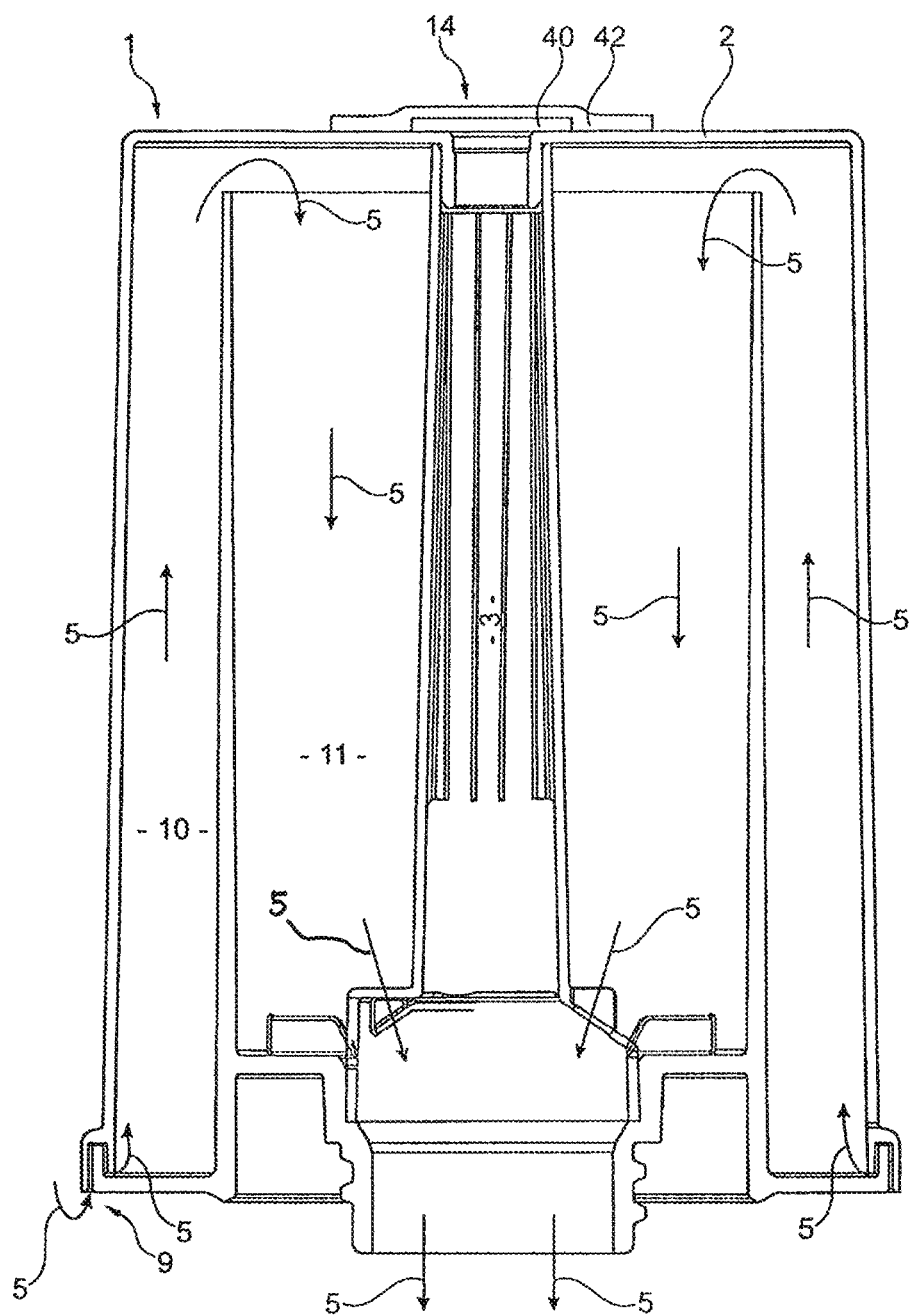
Figure 7:
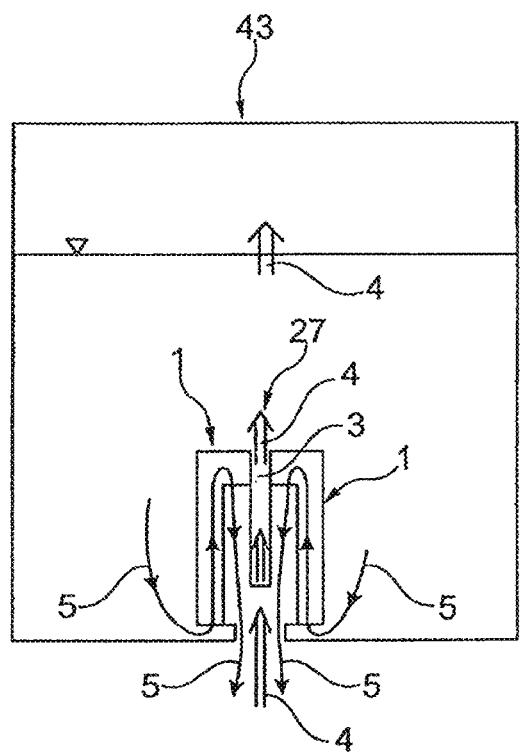
Figure 8:
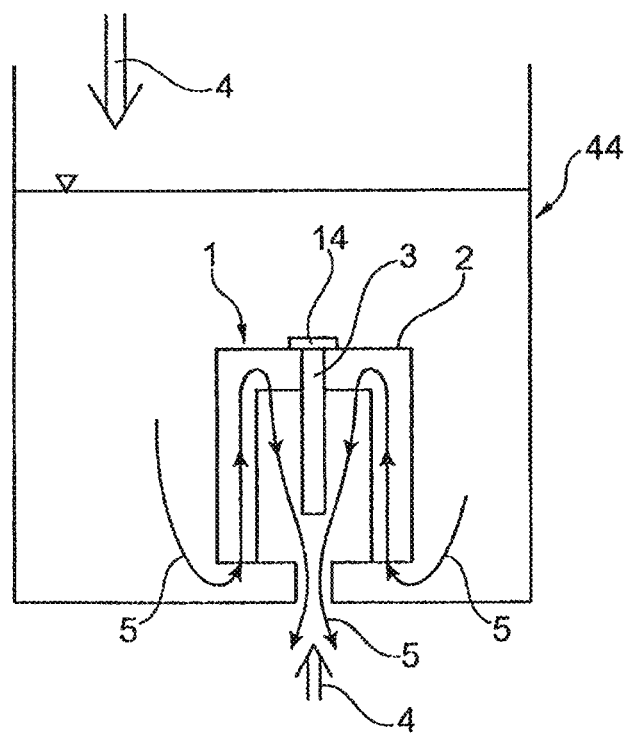
Figure 9:
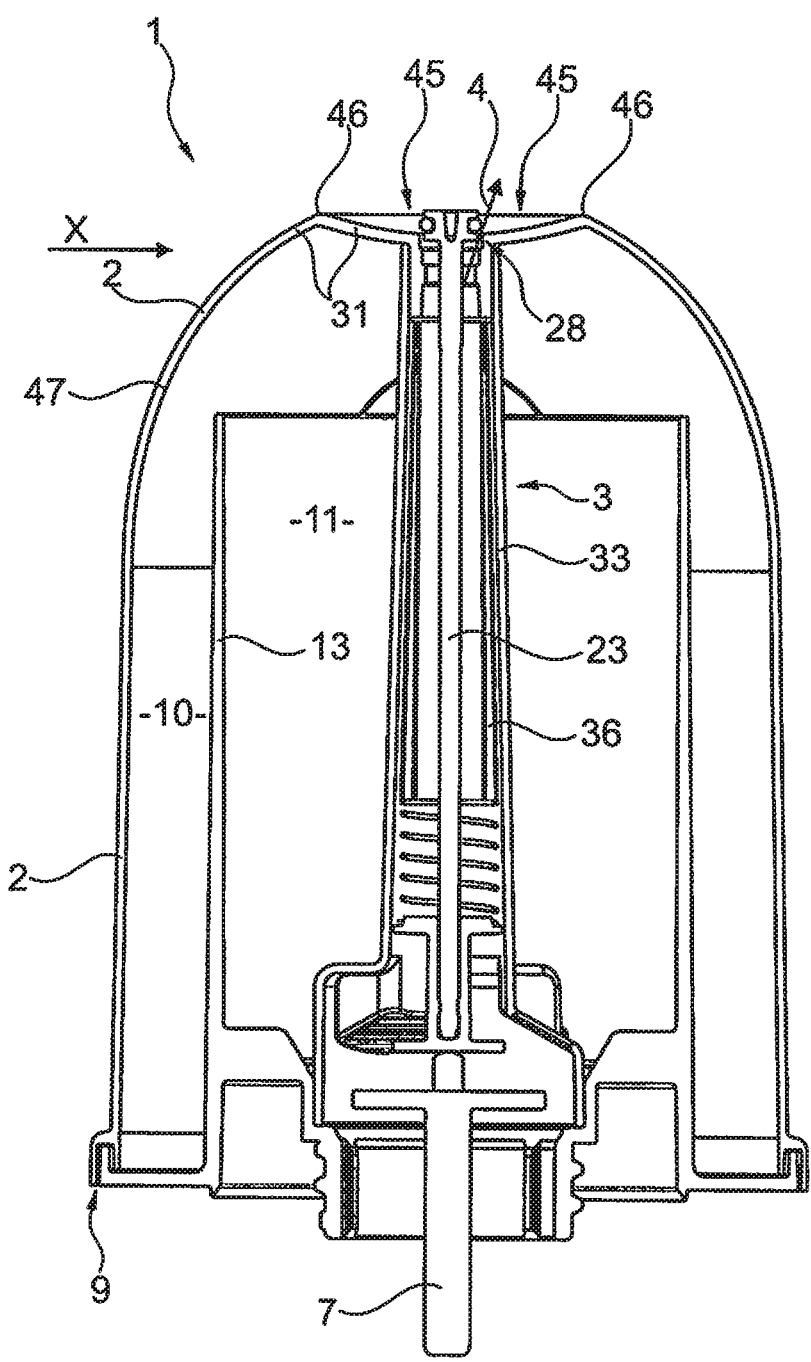
Figure 10:
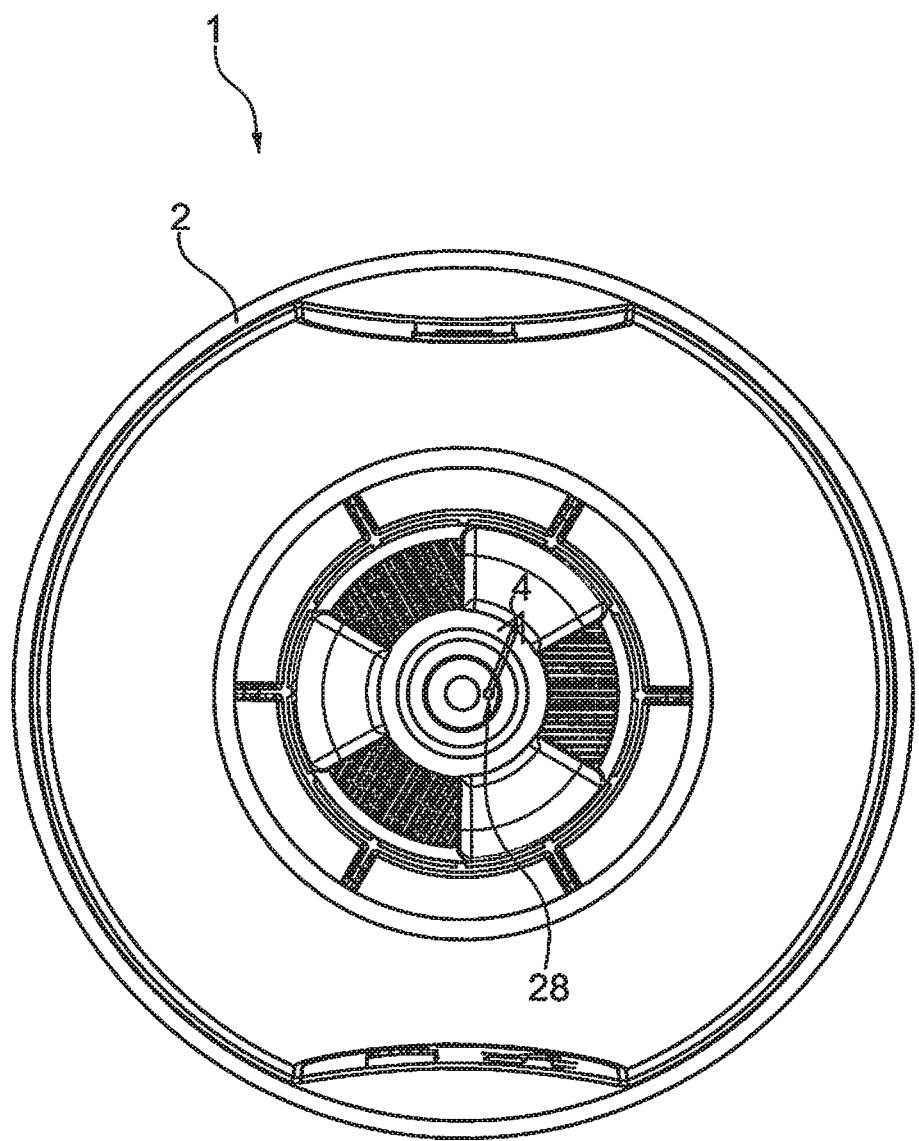

Further advantages and details are explained in more detail below with reference to the schematic illustrations in the figures. In detail:

FIG. 1 shows schematically a sectional illustration along a longitudinal section through a water filter cartridge according to the invention according to a first operating mode with a flow path for air for ventilating a closed water tank shown therein (double arrow) and the flow profile for water to be filtered by the water filter cartridge (single arrows), FIG. 2 likewise shows schematically a sectional illustration of a filter cartridge according to the invention, FIG. 3 in turn shows schematically a sectional illustration along a longitudinal section through a water filter cartridge according to the invention according to a second operating mode, FIG. 4 shows a schematic sectional illustration of a horizontal section through the line III-III of the water filter cartridge according to FIG. 2, FIGS. 5 and 6 in turn show by way of example and schematically a water filter cartridge with an alternative embodiment of a shut-off device for the flow path for ventilating a closed water tank (open FIG. 5 and closed FIG. 6), and FIGS. 7 and 8 show two different operating modes for the water filter cartridge, in which the latter is inserted in FIG. 7 in a tank which is closed in an air-tight manner and which, according to the "bird bath principle", outputs water processed by the water filter cartridge, wherein air for ventilating the tank flows through the flow path for air for ventilating the tank through the cartridge into the tank, whereas, in the illustration of FIG. 8, the flow path for air is closed and the tank is ventilated from above the water and thus ensures pressure equalization, and therefore the water has to flow to the outlet through the filter bed located in the water filter cartridge, and FIGS. 9 and 10 show a further exemplary embodiment of a water filter cartridge modified in relation to FIGS. 1-3.

Accordingly, FIG. 1 shows a water filter cartridge 1 with a housing 2 and a flow path 3 for air 4 (double arrows) for ventilating a water tank (not illustrated) which stores water 5 to be processed by the water filter cartridge and is closed in an air-tight manner. The water filter cartridge 1 can be arranged on the closure cover of a filling opening of the water tank by means of a connection 6 in such a manner that, after the filled water tank is closed with the closure cover, said water filter cartridge is located in the interior of the water tank which is closed in an air-tight manner.

In order to supply the device which further treats the water stored in the water tank, for example an air humidifier, the tank is rotated and placed onto a corresponding receptacle of the device. In the process, a tank closure 7 opens the tank outlet opening (not illustrated). Water thereupon emerges from the water tank and air for ventilating the water tank enters the flow path 3 through the same opening until the pressure in the interior of the water tank is equalized. This is the case whenever a beverage vessel, which is fed by the tank water, of a water level regulating mechanism based on the "bird bath principle" is filled to an extent that no more air can penetrate under the relevant partition for ventilating the tank system into the water tank which is otherwise closed in an air-tight manner.

In the embodiment illustrated in FIG. 1, the connection 6 has a screw thread by means of which the water filter cartridge can be screwed on until a seal 8 which is arranged on the bottom of the housing 2 in a manner lying radially outside said water filter cartridge seals the tank interior via the housing 2 of the water filter cartridge 1 in an air- and water-tight manner in relation to the tank outlet.

As soon as air 4 then flows, said air rises in the flow path 3, and therefore, in order to produce the pressure equalization, the water 5 to be processed by the water filter cartridge is forced to penetrate the water filter cartridge 1 via the inlet openings 9 in the filter housing 2 of said water filter cartridge and to flow through the filtering medium 12 and, in the process, to be processed by the latter and into the water and air separation chamber 33 in FIG. 5 between the combined water outlet and air inlet 4' and the water barrier 27 or blow-off opening 28 resulting in treated water exiting the combination water outlet and air inlet 4' in water filter cartridge 1 as illustrated in FIGS. 1, 2 and 5. Said filtering medium is preferably realized in the form of ion exchange resin and can particular advantageously be supplemented by a further filtering material arranged in series in the through-flow of the water to be processed, for example activated carbon (not illustrated here for simplification reasons). In the embodiment illustrated by way of example here according to FIG. 1, a partition 13 is arranged in order to extend the filtering section within the housing 2, and therefore, as a result, two filter chambers, filter chamber 10 in the upward flow mode and filter chamber 11 in the downward flow mode, are formed for the water to be processed.

According to the invention, shut-off means 14 for the flow path 3 for air 4 are formed on the water filter cartridge 1. An air- and water-tight closure of the filter cartridge can therefore be realized. Said closure means, as illustrated in FIG. 1, are preferably designed in the form of a valve 15.

With reference to FIG. 2, said valve 15 comprises a valve seat 16 formed on the housing 2, a valve body 17 and a seal 18 which is realized here by way of example in the form of a sealing ring.

The shut-off means 14 provided according to the invention open up the possibility, by means of the thus possible air- and water-tight closure of the water filter cartridge, of unexpectedly operating, in a likewise functionally capable manner, a supply concept with the hydraulic functionality for processing water which is stored in a tank closed in an air-tight manner and is removed therefrom by means of the "bird bath principle", even in a supply concept which is completely different physically from this in the form of an open water tank.

This is because the flow path provided for the flow of the water to be processed remains untouched by the effect on the flow path 3 for air 4. A bypass, which is otherwise possible by means of the flow path 3 to the filter path through the filter chambers 10, 11, for the water stored in the tank is therefore reliably closed (cf. FIG. 3).

A type of filter cartridge specified for a certain water processing requirement can therefore be provided in an advantageous manner for different devices which, although they pursue the same use purpose, for example air humidification, with a filtering medium specially coordinated thereto, are based, however, on different hydraulic active principles—the "bird bath principle" with the water storage tank closed in an air-tight manner and/or with actively regulated removal of water, for example with a controlled valve and/or with a suction pump for supplying air to an open water tank.

By the provision of a securing means 19 which, for example, can increase the opening resistance for the shut-off means 14, an inadvertent opening of the shut-off means 14 for the flow path 3 for air can be achieved in a manner increasing the reliability of said function. By the provision of resetting means 20, the shut-off means 14 can be activated again in the deactivated state, i.e. when the flow path 3 is open, in a manner automatically resetting the operating mode of the water filter cartridge, and the flow path 3 for air can be closed. By way of example for this purpose, FIG. 3 illustrates a resetting means 20 having elastic properties, in the form of a spring element clamped between two stops. The primary stress prevailing in the resetting means in the clamped state keeps the valve in the closed position. In the open state of the valve, according to the illustration of FIG. 2, the spring is compressed and, with a route correspondingly opened up, exerts a resetting action in the valve such that the latter returns again into the position according to the illustration of FIG. 3.

By the provision of opening means 21 for the shut-off means 14, the water filter cartridge 1 can be automatically reset to the operating mode for use in a closed water tank—the "bird bath principle". In the embodiments illustrated in FIGS. 2 and 3, said opening means are realized in the form of a mechanical structure 22 which is realized here in particular in the form of a tappet 23.

Said tappet is oriented along a connecting line between the connection 6 of the water filter cartridge 1 and the shut-off means 14, which is designed in the form of a valve 15, for the flow path for air. In FIGS. 1 and 2, in the region of the connection 6, an end side 24 of the tappet 23 lines up on an end side of a closure element "V" of the water tank (not illustrated) which is closed in an air-tight manner with the exception of the connecting opening. In the situation illustrated in FIG. 2, said closure element "V" presses the tappet 23 upward counter to the spring force of the securing means 19 and of the resetting means 20, which means are realized in this exemplary embodiment by means of the spring element depicted in the form of a spiral spring, until the valve 15 is open. Said spiral spring firstly rests in a supporting manner on a tappet shoulder 25 and is supported at its opposite axial end on a bearing 26 in such a manner that, when the tappet is exposed, the valve 15 is closed, as in the illustration according to FIG. 3.

As shown in the illustration of FIG. 2, the flow path 3 for air has a first water barrier 27. In the present example, said water barrier is designed in the form of a blow-off opening 28 (see FIG. 4) which particularly preferably has a clear width of <6 mm and >0.5 mm, in particular preferably 1 mm±1.25 mm. The blow-off opening 28 is designed as a recess on an annular shoulder, which is formed standing radially outwards on the tappet 23, upstream of the valve seat 16 in the flow direction. A cylindrical sleeve 30 which protrudes approximately centrally downwards from the cover 31 of the housing 2 surrounds said annular shoulder 29, and therefore an air-collecting chamber 32 is thereby formed. Air entering the water filter cartridge from the connection 6 can collect in said air-collecting chamber and form an air cushion. Owing to the surface tension inherent to the water and to the corresponding geometrical dimensions, no water coming up from the outside to the blow-off opening 28 from the water tank can penetrate through the blow-off opening 28 into the flow path 3 for air for ventilating the water tank. By means of the design of the air-collecting chamber 32 with an annular cross-sectional structure which is realized by the fact that the tappet 23 is guided centrally through the chamber, the sealing effect by means of the air collected in the form of an air cushion upstream of the blow-off opening 28, as viewed in the flow direction, can be expanded, in a manner supporting the sealing effect, at least to the space region which is available corresponding to the geometrical structures in this regard within the sleeve 30 when the valve 15 is open.

In order to permit a defined guidance of the flow path 3, in a furthermore advantageous manner a first directing element 33 is provided for directing the air 4 rising here from the connection, in the exemplary embodiment shown here as a tubular structure. In order to prevent water from rising to form a water column, said structure is of conical design at least in sections. The cross-sectional reduction in the tube runs here in a direction from the connection 6 towards the point at which the sleeve 30 is inserted.

For further prevention of the rising of water into the air-collecting chamber 32, the flow path 3 has a second water barrier 34. The latter is realized by a portion of the flow path which has a conduit cross section which is abruptly reduced in relation to a portion formed upstream thereof in the flow direction.

In the embodiment illustrated by way of example in FIGS. 1 to 3, said second water barrier is realized by the narrowing 35 of stepped design in the cross section of the flow path between the first directing element for air and the sleeve 30 which is inserted into said narrowing 35. Radially outer bevels on the end side of the sleeve 30 additionally form a flow resistance for water collecting within the first directing element 33 for air. Said water therefore cannot migrate upward beyond said barrier and in the most unfavorable case cause a breakthrough of water at the blow-off opening.

The relevant water drop, on reaching a certain size, runs downwards for gravimetric reasons in the direction of the connection 6 on the inner wall of the directing element 33 for directing the air 4. In order to assist said run-off property, a second directing element 36 for discharging water can be arranged in a furthermore advantageous manner. In the embodiment illustrated, this is preferably realized as a run-off rib. This particularly advantageous arrangement has a vertically oriented portion in the operating position of the water filter cartridge in order to bring about a run-off function as early as possible for water droplets adhering to said portion.

In order to prevent water droplets from entering the air-collecting chamber 32, the run-off rib ends upstream of the air-collecting chamber, as viewed in the flow direction. In the direction of the connection 6, the structure of said run-off rib can be used as a bearing 26 for supporting the securing means 19 or the resetting means 20 for the shut-off means 14. The formation of a plurality of run-off ribs 36 additionally permits a support of the securing and/or resetting means, the support comprising a plurality of bearing points 26, in addition to the number of run-off ribs formed in the flow path 3 in a manner corresponding to an increased run-off effect.

By means of the formation of a water inlet opening 9 in the lower tenth of the vertical extent of the housing 2 of the water filter cartridge 1, with reference to the operating situation, it can be ensured that the water tank concerned can be very readily emptied. When the water inlet opening 9 is arranged directly level with the seal 8, or lying at a level above the latter to such an extent that the water to be processed by the filter cartridge can still flow under the housing of the filter cartridge, even complete emptying of the water tank concerned is ensured.

The advantages as recognized and understood by the inventor are therefore associated with this water filter cartridge so that the air for the pressure equalization can rise unobstructed from the device into the tank by utilizing a "bird bath principle" of water removal regulation by the admission of air substantially corresponding to a volume of treated water discharged through the combined treated water outlet and air inlet as would be recognized by one skilled in the bird bath art. The water 5 can pass here only via the filtration route of the water filter into the device connected to the tank. During the filtering operation for the water, the ventilation route for the tank through the water filter is closed since the water cannot penetrate through the blow-off opening 28.

By means of the shut-off means 14 according to the invention for closing the flow path 3 for air 4 for ventilating a closed water tank, the water filter cartridge 1 can also be used for devices which are equipped with a water tank which is open, with respect to the supply of air, i.e. operate with a completely different system, when considered hydrostatically, than the "bird bath principle" water level regulations.

FIG. 4 only shows a detail of a sectional illustration according to a horizontal section III in FIG. 2. Centrally in the middle, the section through the tappet 23 is depicted as a circular surface 23'. Said section is annularly bordered radially to the outside by the annular shoulder 29 in which, by way of example, the blow-off opening 28 is depicted as an outlet opening for the air flowing out of the air-collecting chamber 32 in order to ventilate the tank. The annular shoulder 29 is in turn annularly surrounded by the first directing element 33 for the air flow, which directing element is realized here, for example, as a tubular structure, the end-side sectional surface of which is identified by 33'. The ring 33" depicted lying radially outside the latter is produced by the conical design and of the directing element 33 and constitutes the outer surface thereof in top view. The regions 38 depicted in the manner of segments symbolize by way of example the sieve-like outlets 38 out of the filter chamber 11 toward the water outlet of the water filter cartridge 1, which water outlet is realized by the connection 6. The segment-like depictions with the number 39 depict non-permeable regions of the structure in this regard of the water filter 1.

By means of the ribs 37 which are arranged directed radially outward from the tappet 23, the tappet 23 can be supported laterally and can therefore be guided from "closed" to "open", or vice versa, during the change of state of the valve 15. And/or the blow-off opening 28 are laterally bounded in the flow direction (see FIGS. 1 and 3).

FIG. 5 shows a water filter cartridge 1 with an alternative embodiment of a shut-off means 14 in the form of a membrane 40. The latter is connected by way of example via a fixing means 41 to the outer side of the housing 2. In order to visualize the venting function of the flow path 3 for air 4 for ventilating a water tank storing water to be processed by the water filter cartridge, the membrane 40 is illustrated raised on the side opposite the fixing means 41. As recognized and understood by those skilled in the art an arrow 4A drawn between the membrane 40 and the housing 2 symbolizes the emergence of air from the flow path 3 in the air directing element or air path flow tube 33 which at the other end joins the counter current water and air separation chamber 3A and connects the treated water inlet 3B to the combined treated water outlet and air inlet 4'. Treated water 5A is admitted to the countercurrent water and air separation chamber 3A through water inlet 3B and is discharged through the combination treated water outlet and air inlet 4'.

FIG. 6 shows the same embodiment as illustrated in FIG. 5, but with a closed shut-off means 14 in the form of a membrane 40 which rests in a manner sealing all the way around on the outer side of the housing of the water filter cartridge 1. In addition, a securing means in the form of a clip 42 is provided here. This can be realized, for example, in the form of an adhesive film which is particularly preferably connected to the housing 2 in a manner completely covering the membrane 40. Additional protection for sealing the flow path 3 can therefore be provided for the use case in which the water filter cartridge can be inserted in a water tank which is hydraulically open at the top. In order to use the water filter cartridge 1 in a hydraulically closed water tank operating according to the "bird bath principle", the clip 42 can be removed. The water filter cartridge 1 then functions as illustrated in FIG. 5.

In order to explain the operating methods, FIG. 7 shows an embodiment of a water tank 43 which is completely closed hydraulically with the exception of the outlet opening. This water tank 43 is ventilated in accordance with the "bird bath principle" by air 4 being supplied, in accordance with the arrows depicted, through the flow path 3 in the water filter cartridge 1 inserted in the interior of the water tank 43. For reasons of clarity, both tank and water filter cartridge have been illustrated merely schematically with the essential aspects with regard to conduction of the air and of the water to be processed.

In contrast to the embodiment of the water tank 43 in FIG. 7, in FIG. 8 the water tank 44 is hydraulically open and is therefore illustrated symbolically at the top without a cover or the like. The shut-off means 14 in the water filter cartridge 1 are shown here in the closed state, also only symbolically here in turn for the sake of simpler illustration. In this second operating case, the water flow of the water 5 kept in the tank 44 can also flow only via the filtering section which is arranged in the interior of the water filter cartridge 1 and is in the form of the filter chambers 10, 11 since, in particular, a passage through the flow path 3 for air and ventilation of a closed water tank is closed by the shut-off means 14. When water 5 is correspondingly removed at the outlet of the water tank 44, the water 5 kept therein can easily flow thereafter since air 4 can penetrate from the outside into the tank 44 through the latter, which is not closed, and therefore no retaining vacuum can arise in the interior of the tank.

The water filter cartridge 1 according to the invention can therefore be optionally operated for a hydraulically closed water tank 43 operating according to the "bird bath principle" in accordance with the example in FIG. 7, and also when the shut-off means 14 is activated and therefore the flow path 3 is closed—for a hydraulically open water tank 44 for the second operating method.

FIG. 9 shows by way of example and schematically a cross-sectional illustration of an embodiment of a water filter cartridge 1 that is modified in relation to FIGS. 1-3. Said water filter cartridge has an indentation 45 in the end-side head region of the housing 2, for example in the form of a crater, and ends with an indentation edge 46 in the axial extent of the housing. The indentation 45 forms an "air trap". In the latter, when the passage for the air 4 for ventilating the water tank is open, air emerging in the form of small air bubbles can collect to form a large bubble until the latter experiences a correspondingly greater buoyancy force than the adhesive force by adhesion to the outer side of the water filter cartridge and the water pressure pressing against the boundary layer of the water drop. By this means, an additional sealing effect can be provided against water which is to be filtered not penetrating the water filter cartridge in accordance with the operation, and therefore against the latter being bypassed.

By means of a rounded portion 47 which merges from the indentation edge 46 to a sleeve-shaped, for example cylindrical, portion of the housing 2 on the outer side thereof, an increase in size of the usable tank volume can be achieved by the corresponding reduction in the outer volume of the filter cartridge. In addition, by this means, an installation aid on the basis of improved ergonomic properties when holding the water filter cartridge can be provided.

The indentation edge 46 surrounding the indentation furthermore brings about mechanical protection of the sealing means for the ventilation air 4A, at least against the action of flat objects. Thus, for example if the cartridge is inadvertently dropped, when the water filter cartridge strikes against, for example, a table surface or the floor, the sealing means remain protected even when a valve is open and the valve tappet protrudes.

FIG. 10 shows a top view of a water filter cartridge according to the illustration of FIG. 9 at the section height "X". The outer boundary depicts the housing 2 of the water filter cartridge 1. The blow-off opening 28 from which symbolically a double arrow 4 for the air ventilating the water tank during operation leads is depicted centrally in the middle.

The remaining elements shown correspond analogously to those in the illustration of FIG. 4. The reference signs additionally depicted in FIG. 9 also correspond to the features depicted in FIGS. 1-3.

LIST OF REFERENCE SIGNS

1 Water filter cartridge
2 Housing
3 Flow path
3A Counter current water and air separation chamber
3B Treated water inlet
4 Air
4' Combined treated water outlet and air inlet
5 Water
5A Treated water arrow
6 Connection
7 Tank closure
8 Seal
9 Inlet opening
10 Filter chamber
11 Filter chamber or water treatment chamber
12 Filtering medium
13 Partition
14 Shut-off means
15 Valve
16 Valve seat
17 Valve body
18 Seal
19 Securing means
20 Resetting means
21 Opening means
22 Mechanical structure
23 Tappet
24 End side
25 Tappet shoulder
26 Bearing
27 First water barrier
28 Blow-off opening
29 Annular shoulder
30 Sleeve
31 Cover
32 Air-collecting chamber
33 First directing element for air or air path flow tube
33' Sectional surface
33" Ring
34 Second water barrier
35 Narrowing
36 Second directing element for water
37 Rib
38 Sieve
39 Covering
40 Membrane
41 Fixing means
42 Clip
43 Water tank (hydraulically closed)
44 Water tank (hydraulically open)
45 Indentation
46 Indentation edge
47 Rounded portion

What is claimed is:

1. In a water filter cartridge with a housing and a flow path for air for ventilating a water-storing water tank having an air-tight closure which feeds the water filter cartridge with the water filter cartridge having a filter cartridge water inlet and a filter chamber containing a filter medium wherein the improvement of the filter cartridge comprises an air flow path tube with a water directing element or ribs projecting radially on the inside surface of the air flow path tube, said air flow path tube separating the filter medium from the flow path for air and a counter current water and air separation chamber disposed at a bottom end of the air flow path tube, said counter current water and air separation chamber having at one end a combined treated water outlet and air inlet to simultaneously allow a discharge of treated water and an admission of air from the combined treated water outlet and air inlet and a membrane water barrier disposed on or over a terminal top end of the air flow path tube to allow the flow path for air while preventing the admission of water, said counter current water and air separation chamber also having a treated water passage connected radially to the filter chamber and disposed intermediate a top end of the counter current water and air separation chamber and the bottom end of the air flow path tube to admit air corresponding substantially to a volume of treated water discharged and wherein the counter current water and air separation chamber is connected directly to the combined treated water outlet and air inlet and is disposed at the bottom end of the air path flow tube opposite to the top end with the membrane water barrier.

2. The water filter cartridge according to claim 1 wherein the counter current water and air separation chamber has an air-collecting chamber disposed below the membrane water barrier and a terminal end of the counter current water and air separation chamber.

3. The water filter cartridge according to claim 2 wherein the air-collecting chamber has a cross-sectional structure of an annular configuration.

4. The water filter cartridge according to claim 1 wherein the counter current water and air separation chamber is connected to the air flow path tube and said air flow path tube has a first directing element for directing the air.

5. The water filter cartridge according to claim 4 wherein the first water directing element are ribs vertically oriented within the first directing element to direct water droplets.

6. The water filter cartridge according to claim 4 wherein the first directing element has a conical shaped portion.

7. The water filter cartridge according to claim 1 wherein the counter current water and air separation chamber is connected through the air flow path tube to a second water barrier.

8. The water filter cartridge according to claim 1 wherein the counter current water and air separation chamber is connected through the air flow path tube to a second water barrier having an abruptly reduced conduit cross section.

9. The water filter cartridge according to claim 8 wherein the second water barrier has a narrowing stepped configuration in the cross section of the air flow path tube.

10. The water filter cartridge according to claim 4 wherein the water directing element discharges water droplets from the air How path tube into the counter current water and air separation chamber.

11. The water filter cartridge according to claim 10 wherein the water directing element is a run-off rib.

12. A water filter article of manufacture comprising:
(a) a housing having a top and a bottom and an untreated water inlet at the bottom of the housing and a water treatment chamber containing a filter medium and a treated water outlet;
(b) a counter current treated water and air separation chamber having a first open end and a second open end connected to a combined treated water outlet and air inlet port to simultaneously dispense a volume of treated water substantially corresponding to a volume of simultaneously admitted air;
(c) a first directing element with an inside surface for directing air and an outside surface disposed inside a portion of the filter medium and having a first end connected to the first open end of the counter current treated water and air separation chamber, said first directing element having a second end terminating in a water barrier disposed over or on a terminal end of the first air directing element to allow the passage of a volume of air corresponding substantially to the volume of treated water discharged while preventing the admission of untreated water from outside the water barrier;
(d) an air trap disposed in the first directing element between the water barrier and the counter current treated water and air separation chamber;
(e) a second directing element or ribs for directing water droplets disposed on the inside surface of the first directing element, said second directing element or ribs projecting substantially perpendicular to the inside surface of the first tubular element and extending vertically between the first end and the second end of the first directing element and within the first directing element to remove the water droplets from air in the first directing element and return the water droplets to the counter current treated water and air separation chamber at the first end of the first directing element; and
(f) a treated water inlet to the counter current treated water and air separation chamber disposed between the first open end and the second open end of the counter current treated water and air separation chamber and connected to the treated water outlet of the water treatment chamber.

13. The water filter article of claim 12 wherein the water treatment chamber, the counter current treated water and air separation chamber and the first directing element are in axial alignment with the housing.

14. A water filter device comprising:
(a) a water filter housing having a water inlet and a water treatment section;
(b) a tubular air directing element having at one end a water barrier over or on a terminal end of the tubular aft directing element to open and close one end of the tubular air directing dement and with a blow off opening disposed directly below the water barrier to avow the passage of aft while preventing the admission of water;
(c) the water treatment section disposed around the tubular aft directing element having a treated water passage;
(d) a counter current water and air separation chamber having a top end connected or attached to a bottom end of the tubular air directing dement;
(e) a combined treated water outlet and air inlet opening at an opposite end of the filter housing from the water barrier to simultaneously discharge water and admit air, said combined treated water outlet and air inlet connected to a bottom end of the counter current water and aft separation chamber;
(f) a radially projecting water directing dement or ribs disposed on an inside surface of the tubular aft directing dement; and
(g) wherein the treated water passage from the water treatment section is disposed intermediate to the counter current water and air separation chamber and the tubular air directing element for directing air.

15. The water filter device of claim 14 wherein the tubular air directing element is of a conical configuration and has an air directing element to control the size of bubbles or volume of air released by the water barrier.

16. The water filter of claim 14 further comprising a second water barrier disposed in the tubular air directing element.

17. In a water filter cartridge apparatus housing a water treatment section containing a water treatment medium and a flow path for air for ventilating to a water-storing water tank having an air tight closure which feeds a water treatment apparatus wherein the improvement comprises a first treated water passage from a filter medium connected to a counter current water and air separation chamber and where said counter current water and air separation chamber is connected to a combined treated water outlet and air inlet to simultaneously admit air and discharge treated water in a volume substantially corresponding to a volume of simultaneously admitted air and an air path flow tube with the flow path for air disposed inside the air path flow tube and a membrane shut-off device to open and close the flow path for air at the top end of the air path flow tube with the bottom end of the air path flow tube connected to the counter current water and air separation chamber and a radially projecting water directing element or ribs also disposed inside the air path flow tube to direct water droplets back down to the counter current water and air separation chamber.

18. The water filter cartridge according to claim 17 wherein the air path flow tube has a directing element disposed at the top end of the air path flow tube to control the size of bubbles or volume of air released by the water filter cartridge.

19. The water filter cartridge according to claim 17 further comprising a blow off opening with a clearance of <6 mm and >0.5 mm or about 1 mm±0.25 mm.

* * * * *